United States Patent [19]
van den Berg

[11] Patent Number: 5,809,932
[45] Date of Patent: Sep. 22, 1998

[54] IMPLEMENT FOR MILKING ANIMALS

[75] Inventor: Karel van den Berg, Bleskensgraaf, Netherlands

[73] Assignee: Maasland N.V., Netherlands

[21] Appl. No.: 692,070

[22] Filed: Aug. 7, 1996

Related U.S. Application Data

[63] Continuation of PCT/NL95/00417 Dec. 8, 1995.

[30] Foreign Application Priority Data

Dec. 9, 1994 [NL] Netherlands ............................ 9402078
Feb. 8, 1995 [NL] Netherlands ............................ 9500232

[51] Int. Cl.⁶ ...................................................... A01J 5/04
[52] U.S. Cl. ..................................... 119/14.47; 119/14.08
[58] Field of Search .............................. 119/14.47, 14.48, 119/14.49, 14.5, 14.51, 14.52, 14.53, 14.08, 14.38, 14.46, 14.02, 14.01

[56] References Cited

U.S. PATENT DOCUMENTS

| | | | |
|---|---|---|---|
| 1,641,316 | 9/1927 | Bruun | 119/14.47 |
| 3,373,720 | 3/1968 | Duncan | 119/14.02 |
| 3,406,663 | 10/1968 | Duncan | 119/14.01 |
| 3,476,085 | 11/1969 | Noorlander | 119/14.36 |
| 3,931,795 | 1/1976 | Duncan | 119/14.38 |
| 4,616,215 | 10/1986 | Maddalena | 340/626 |
| 5,069,160 | 12/1991 | Street et al. | 119/14.08 |
| 5,069,162 | 12/1991 | Thompson et al. | 119/14.47 |
| 5,080,040 | 1/1992 | Van Der Lely et al. | 119/14.09 |
| 5,134,967 | 8/1992 | Marshall | 119/14.47 |
| 5,379,721 | 1/1995 | Dessing et al. | 119/14.08 |

FOREIGN PATENT DOCUMENTS

| | | |
|---|---|---|
| 3376178 | 8/1976 | Germany. |
| 1066573 | 4/1967 | United Kingdom. |
| 2030838 | 4/1980 | United Kingdom ................ 119/14.51 |
| PCT/NL92/ 00162 | 9/1992 | WIPO. |

OTHER PUBLICATIONS

International Search Report (PCT) for Netherlands Application No. 9402078, filed Dec. 9, 1994.

*Primary Examiner*—Edgar S. Burr
*Assistant Examiner*—Dave A. Ghatt
*Attorney, Agent, or Firm*—Penrose Lucas Albright

[57] ABSTRACT

An apparatus for automatically milking animals comprising a milking machine provided with teat cups. Each teat cup has three lines connected thereto which include a line causing the teat cup to pulsate, a line for carrying milk from the teat cup, and an air suction line extending into an enlarged lower space above the connection of the milk line. In the air suction line, a sensor can be incorporated for the purpose of ascertaining the pressure in the space wherein the animal's teat is received. The three lines received by the teat cup may be defined by side-by-side passages through a common flexible integral line. The enlarged lower part which contains the space receiving the air suction line has a greater diameter than the upper part in which the teat of the animal is received, and the upper and lower parts are removably interconnected to each other.

25 Claims, 2 Drawing Sheets

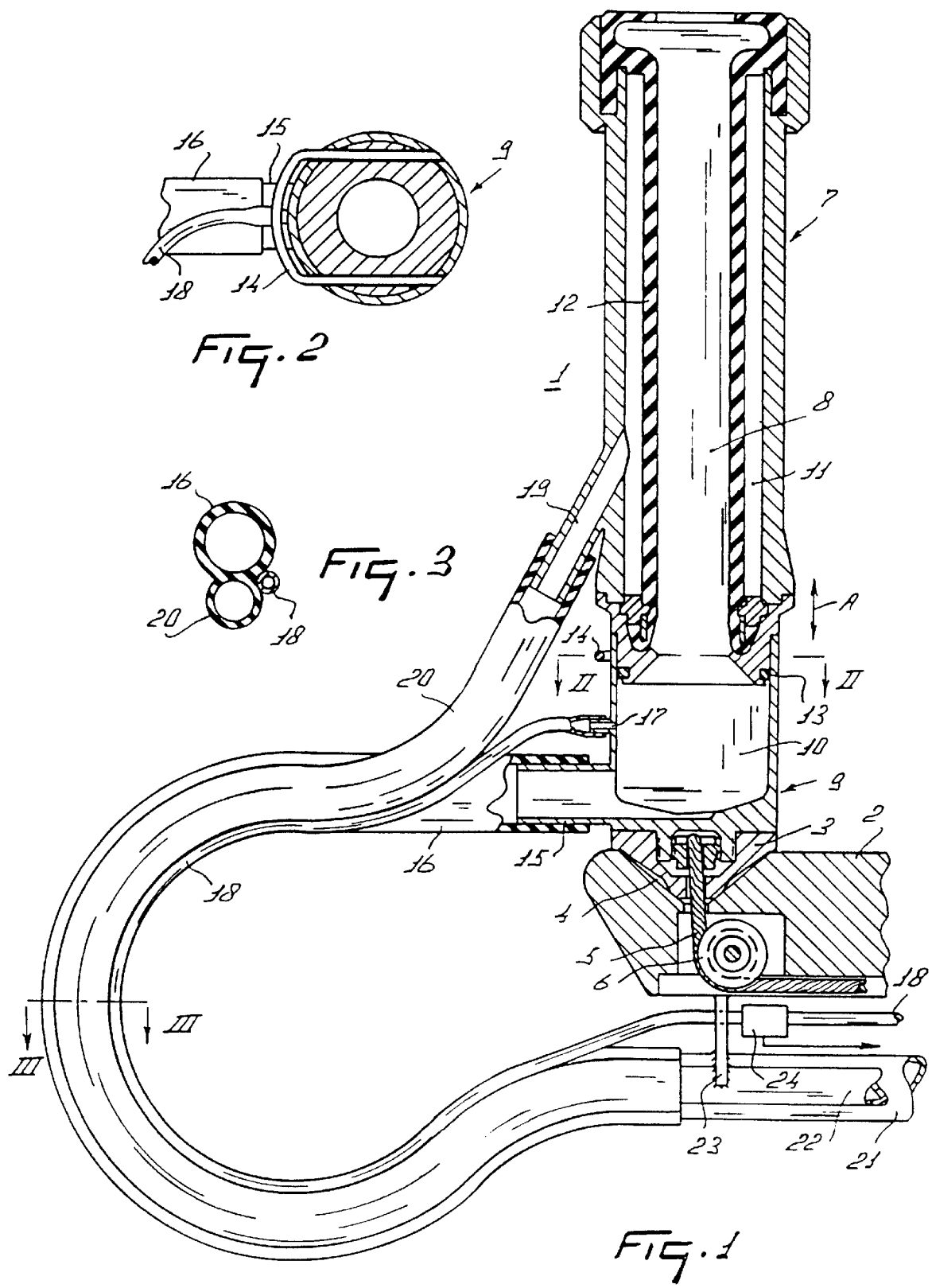

IMPLEMENT FOR MILKING ANIMALS

RELATED APPLICATION

This is a Continuation Application of PCT Application PCT/NL95/00417, filed Dec. 8, 1995 (this PCT Application is no longer pending).

FIELD OF THE INVENTION

The present invention relates to an apparatus for milking animals, such as cows, comprising a milking machine which is provided with teat cups, milk lines connected thereto, said apparatus being provided with further means for the transporting or collecting of milk received from the animal's teats.

SUMMARY OF THE INVENTION

The apparatus in accordance with the invention is provided with at least one air suction line having one end in the teat space of a teat cup or extending into a milking line or into a milking cluster. Another possibility is to connect the line to an air filter or, via an air filter, to an air compression device.

In a particular embodiment according to the invention, a sensor may be incorporated into the air suction line for the purpose of ascertaining the pressure in the space for receiving the teat. These sensors can be incorporated in the milk lines themselves; for example, from the PCT International Patent Application No. WO 93/0564, a vacuum-sensitive sensor is disclosed which is incorporated in the milk lines connected to the teat cups. In practice, the vacuum sensors are usually situated at a relatively long distance from the teat cups. When a teat cup is connected to a teat of an animal to be milked, there will prevail in the teat cup and in the milk line connected thereto, a vacuum amounting to, for example, 30 kPa below ambient atmospheric pressure. When the teat cup is kicked off from a teat by the animal, a vacuum will be maintained on the milk line and air will be drawn through the teat cup. As a result, the degree of vacuum at the location of the vacuum sensor will fall; in a specific embodiment, it has been ascertained in practice that the vacuum reduces to 25 kPa below ambient atmospheric pressure. When, however, the sensor had been incorporated in the air suction line, upon the teat cup being removed from the teat, the pressure measured by the sensor almost corresponded to that of the ambient atmosphere. In other words, a sensor incorporated in an air suction line is considerably more sensitive than when such a sensor is incorporated in a milk line. Furthermore, a sensor incorporated in an air suction line is less vulnerable than one that is in contact with the milk; therefore, in the latter case, a sensor which is considerably more expensive is required.

According to a further aspect of the invention, the teat space consists of an upper space into which a teat can be inserted, and a lower part connected thereto into which the air suction line debouches. In a particular embodiment, a milk line debouches into the lower space, while a pulsation line connected with a pulsator debouches into the pulsation space surrounding the upper space.

Further, the air suction line may be connected to a filter, preferably an activated carbon filter, or whether or not via such a filter, it is connected to an air compression vessel. In the latter case, the air suction line is preferably connected to a buffer reservoir which, possibly via a pressure control valve, is in connection with the air filter or the air compression vessel. In a particular embodiment, the air suction line includes a first part which is connected to the air filter or the air compression vessel and debouches into a buffer reservoir, to which reservoir is connected a second air suction line part extending to a teat cup. The first air suction line part may then extend through the buffer reservoir and debouch therein near the debouchment of the second air suction line part. The first air suction line part will then be so narrow that the pressure in the buffer reservoir may be in the order of that of the ambient atmosphere or slightly higher; as a safeguard, the buffer reservoir may be provided with an air discharge opening or overpressure valve.

In order to be able to change quickly and easily the teat lining of the teat cup described so far, according to the invention, the teat cup may comprise two parts that are removably interconnected, the upper part surrounding the upper space and the lower part surrounding the lower space. However, such an idea is not only applicable to the above-described teat cups but can also be applied to all other possible types of teat cups. Therefore, the invention also relates to an apparatus for milking animals, such as cows, comprising a milking machine provided with teat cups, milk lines connected thereto, and further means for transporting and collecting milk emitted from the teats, which apparatus is then characterized in that a teat cup comprises two parts that are removably interconnected, the upper part surrounding an upper space into which there can be inserted a teat of an animal to be milked, and the lower part surrounding the lower space, which serves as a buffer. The two parts of a teat cup can then be designed so as to be adapted to telescope into each other over a relatively short distance, while there can be provided a locking element for fixing same relative to each other.

In particular, in the case that, apart from a milk line, there is provided a pulsation line and an air suction line, according to the invention, the lines connected to a teat cup can be designed as an integral line system. Therefore, the invention also relates to an apparatus for milking animals, such as cows, comprising a milking machine provided with teat cups, milk lines connected thereto, and further means for the purpose of transporting and collecting milk yielded, which apparatus is then characterized in that the lines connected to a teat cup are designed as an integral line system.

According to a further aspect of the invention, the apparatus can be provided with a milking robot for automatically connecting and disconnecting teat cups to and from the teats of an animal. In a favorable construction, the milk line and the pulsation line can each be connected to a line attached to the arm of the milking robot. After having been connected to a teat, the teat cup can be released from the robot arm, but remains connected thereto, not only via the milk line and the pulsation line, but also via a flexible element, with the aid of which the teat cup can again be drawn against the robot arm while furthermore using a control cylinder attached to or in the robot arm. Apart from an apparatus as described, the invention also relates to a teat cup as is applied in the aforementioned apparatus.

BRIEF DESCRIPTION OF THE DRAWINGS

For a better understanding of the invention and to show how the same may be carried into effect, reference will now be made, by way of example, to the accompanying drawings, in which:

FIG. 1 is a cross-section of a teat cup according to the invention and the lines connected thereto;

FIG. 2 shows schematically how the two parts of a teat cup are interconnected according to the invention;

FIG. 3 is a cross-section of a milk line, a pulsation line and an air suction line that are constructed as an integral line system.

DESCRIPTION OF THE PREFERRED EMBODIMENT

Figure 4:
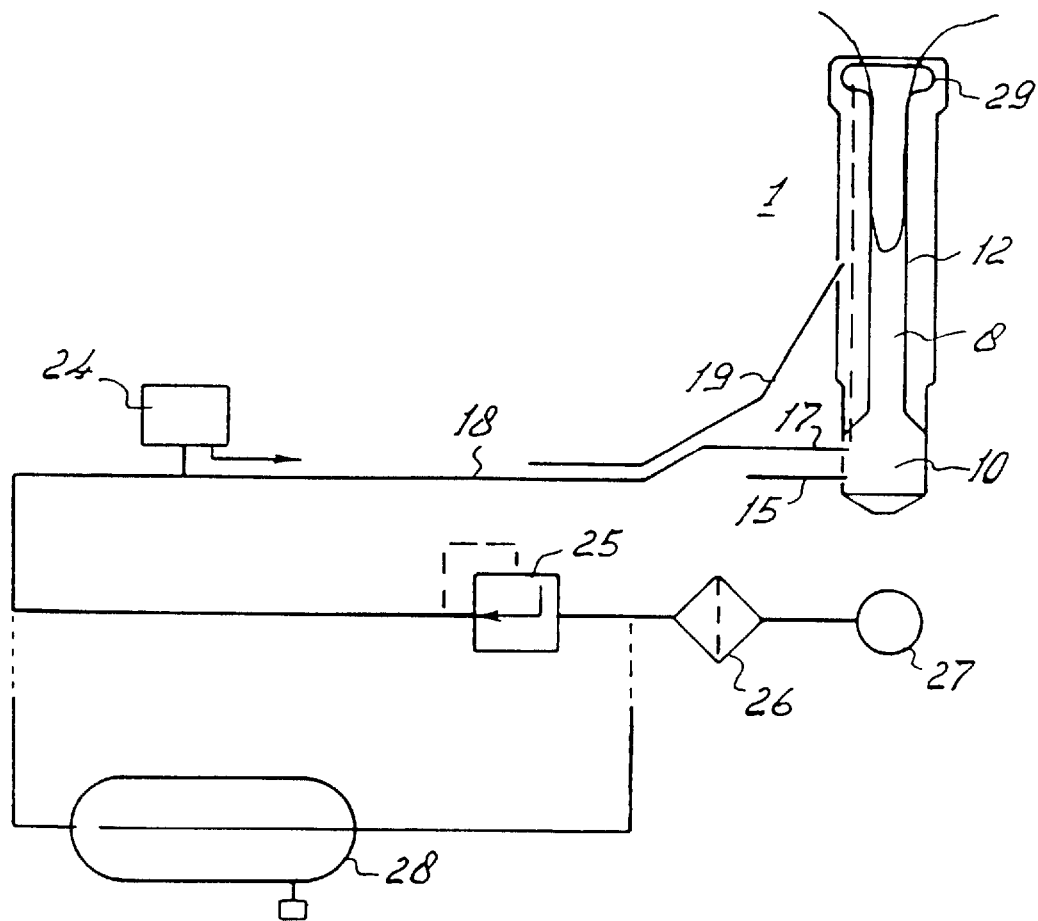
FIG. 4 illustrates schematically an alternative embodiment of a teat cup with an air suction line.

In FIG. 1 a teat cup is indicated by the reference numeral 1. This teat cup constitutes part of a milking machine for automatically milking animals, such as cows, which machine, in particular for milking cows, comprises four teat cups of this type, while, furthermore, there are provided milk lines that are connected to these teat cups, and further means for transporting and collecting milk that result from milking the animal. Said further means, not being of special interest to the present invention, will not be described in detail.

The apparatus, of which the milking machine constitutes part, may also comprise a milking robot for automatically connecting to and disconnecting from the teats of the animals. For this purpose, such a milking robot is provided with a computer-controlled robot arm. Such milking robots, being known in the art, will not be described herein, in detail.

FIG. 1 shows the end of a robot arm 2, as well as the manner in which teat cup 1 is held against the end of this robot arm 2. For that purpose, at its lower sides, teat cup 1 has a tapering part 3 that fits in a recess 4 at the upper side of the robot arm end. To the bottom sides of teat cup 1 there is attached a flexible element 5, in the form of a cable or cord, which flexible element 5 passes through the tapering part 3 of the teat cup 1 and, via a pulley 6, through an opening in the recess 4 of robot arm 2 to a control cylinder and piston member (not shown) attached to or in the robot arm 2. When teat cup 1 is connected to a teat, and this cylinder and piston member is released so that, when teat cup 1 is connected to the teat, robot arm 2 can be withdrawn, and teat cup 1 is released from the robot arm 2, although, via the flexible element 5, it remains connected thereto. After milking, or when for other reasons vacuum in teat cup 1 is not maintained, this teat cup will fall from the teat. At the same time, the control cylinder and piston member attached to or installed in robot arm 2 is energized and, by means of flexible element 5, teat cup 1 is drawn against robot arm 2.

Teat cup 1 comprises two parts: an upper part 7 surrounding an upper space 8, into which a teat of an animal to be milked can be inserted, and a lower part 9 surrounding the lower space 10, which serves as a buffer for the milk collected. The upper space 8 and the lower space 10 are interconnected and, together, constitute the teat space of teat cup 1. In the upper teat cup part 7, there is created a pulsation space 11 around the upper space 8. For that purpose, spaced from the outer wall of the upper teat cup part 7, there is provided a teat lining 12. The upper teat cup part 7 and the lower part 9 thereof are designed so as to be adapted to telescope into each other. In the embodiment shown in FIG. 1, the upper teat cup part 7 is adapted to telescope into the lower part 9 over a distance A, while, by means of the seal ring 13, there is obtained an air-tight sealing.

FIG. 2 shows how the two teat cup parts 7 and 9 can be fixed relative to each other. For that purpose, a locking element 14 is provided which is capable of easily being applied and removed, which element can be inserted through the outer wall of the lower teat cup part 9 and through apertures at the bottom of the upper part 7.

At the bottom of the lower teat cup part 9, there is arranged a connecting piece 15 for a milk line 16 debouching, that is, emerging into the lower space 10. Thereabove and also debouching into the lower space, there is disposed a connecting piece 17 for an air suction line 18.

On the upper teat cup part 7 there is provided a connecting piece 19 for a pulsation line 20, via which there can be established, in the pulsation space 11, a fluctuating vacuum to stimulate the milking process. Milk line 16 and pulsation line 20 are, respectively, connected to a rigid milk line 21 and a rigid pulsation line 22. Via a support 23, these two lines are attached to the bottom of robot arm 2.

In air suction line 18, there is incorporated a sensor 24 for the purpose of ascertaining the pressure in the teat space. The opposite end of the air suction line, which is not connected to connecting piece 17, is open to atmospheric air. The opposite end of air suction line 18 emerges into a recess, which is a more or less closed-off recess, which is remote from dust and dirt that originates from the milking parlor, so that the air suction line 18 avoids being contaminated.

Sensor 24, which can be attached to support 23 or connected directly to robot arm 2, is in communication with the computer of the apparatus. When teat cup 1 is connected to a teat of an animal to be milked, there prevails a vacuum in the teat space. Depending on the place where sensor 24 is incorporated in air suction line 18, this sensor records a certain value for vacuum; this value is a measure for the vacuum that exists in the teat space. The vacuum value ascertained by sensor 24 is transmitted to the computer of the milking system. Upon connecting the teat cups to the teats, the value of this vacuum is an important factor because only when there is sufficient vacuum in the teat space can the teat cup be assumed to be connected to the teat and robot arm 2 can be, therefore, displaced and the teat cup remain connected to the robot arm only by the no longer taut flexible element 5.

When the teat cup is not connected to a teat, or when the teat cup is kicked off by the animal, the degree of underpressure or vacuum in milk line 16 is minimal. Air is being drawn into the teat cup and the pressure in the teat cup is almost the same as that of the ambient atmosphere. Accordingly, it is this pressure that is sensed by the sensor 24 and transmitted to the computer.

Milk line 16, air suction line 18 and the pulsation line 20 can make up an integral line system. A possible cross-section of such an integral line system is shown in FIG. 3.

In the embodiments of FIG. 1, the air suction line 18 is, as previously stated, in direct connection with the outer atmosphere in an arrangement so that dust and dirt from the neighboring environment will not be received in the teat cup and there is no risk of clogging of that line.

In FIG. 4, a teat cup is shown schematically including air suction line 18 with sensor 24, air suction line 18 being connected, via a pressure control valve 25 and an air filter 26, preferably designed as an activated carbon filter, to an air compression vessel 27. Although air suction line 18 could be connected directly to the air compression vessel 27, or via the pressure control valve 25 by means of which the high pressure of the air flowing from the air compression vessel 27 can be reduced to that of the outer atmosphere or slightly higher, it is preferred to use the air filter, air in the air compression vessel not being completely pure. Air flowing from air compression vessel 27 is then cleaned in filter 26, after which, subsequently, pressure is adjusted by pressure control valve 25.

In the same FIG. 4 an alternative for pressure control valve 25 is indicated. In this alternative embodiment, there is provided a buffer reservoir 28 which is incorporated in air suction line 18. The air suction line part connected to air filter 26 then extends through buffer reservoir 28 and emerges near the connection of air suction line 18 to the teat cup. The air suction line part connected to filter 26 has such a narrow cross-section that in buffer reservoir 28 there will prevail a suitable reservoir for providing air to the teat cup. In case the pressure increases more than desirable, the overpressure can escape from the buffer reservoir via an air discharge opening or relief valves in the wall thereof.

In the embodiments of FIGS. 1 and 4, air suction line 18 emerges into the lower teat space 10 of the teat cup. In FIG. 4 is shown, by means of dashed lines, how air suction line 18 can be passed through the teat cup wall or through the pulsation space upwardly and emerge into an annular space 29 located relatively closely below the upper edge of the teat cup 1. When the air suction line 18 emerges into the lower part of the teat space, then during milking, there will prevail in the lower part of the teat space a vacuum or an underpressure in the order of 40 kPa below ambient atmospheric pressure and in the annular space 29 relatively closely below the upper edge of the teat cup an underpressure of 10 kPa below ambient atmospheric pressure.

In practice, there is almost always air leakage from outside along the sides of the teat into the milk line. At the same time, contaminated air including dust particles are drawn into the milk line. In order to reduce this, the air suction line may extend into the annular space 29. Hereby, the underpressure in this space is reduced to approximately 5 kPa below ambient atmospheric pressure, thereby also considerably reducing air leakage from outside the teat cup and hence the amount of dust and contaminations into the teat cup and milk line.

The invention is not restricted to the embodiment described and shown here, but it includes other modifications falling within the scope of the following claims. The air suction line 18 may, for example, extend into the milk line 16, preferably near the connection of the milk line to the teat cup, instead of into the lower space 10 of the teat cup.

Having disclosed my invention, what I claim as new and to be secured by Letters Patent of the United States is:

In the claims:

1. An apparatus for milking animals, such as cows, comprising a milking machine which includes teat cups, milk lines connected thereto, and an air suction line connected to a teat space of a said teat cup, said air suction line connected to a source of air and providing air into the teat space of said teat cup.

2. An apparatus as claimed in claim 1, comprising a sensor in said air suction line for the purpose of sensing the pressure in said teat space.

3. An apparatus in accordance with claim 1, wherein said teat space comprises an upper space into which the animal's teat is received and a lower space under the animal's teat when received in said teat space, said air suction line being connected directly into said lower space.

4. An apparatus in accordance with claim 3, comprising a pulsation line, said pulsation line connected directly to an annular space surrounding said upper space.

5. An apparatus as claimed in claim 3, wherein said teat cup comprises an interliner for receiving the animal's teat in said upper space, said lower space being disposed under said interliner.

6. An apparatus in accordance with claim 5, wherein said lower space has a diameter which is larger than the diameter of said teat space.

7. An apparatus in accordance with claim 1, wherein said source of air comprises an opening from said air suction line to the atmosphere and space is provided between where said opening is and where the animal is milked that is sufficient so that air from said source is not significantly contaminated by anything in the atmosphere that emanates from the vicinity of where the animal is milked.

8. An apparatus in accordance with claim 1 comprising an air filter in said air suction line.

9. An apparatus in accordance with claim 1 wherein said source of air comprises an air compression vessel.

10. An apparatus in accordance with claim 1 comprising an buffer reservoir which is interconnected to said air suction line.

11. An apparatus in accordance with claim 10 comprising a second air suction line which interconnects said buffer reservoir and part of said upper space in said teat cup which surrounds the opening into which the animal's teat is received so that it reduces the degree of vacuum in said part of said upper space which surrounds the opening where the animal's teat is received thereby reducing the air leakage around the animal's teat into said teat space.

12. An apparatus in accordance with claim 1 wherein said source of air is an air compression vessel and said air suction line comprises a first part which extends from said air compression vessel to a buffer reservoir and a second part which extends from said buffer reservoir to said teat space.

13. An apparatus in accordance with claim 12, wherein said buffer reservoir includes a pressure relief valve.

14. An apparatus in accordance with claim 1, wherein said teat cup comprises an upper part which surrounds said teat space and a lower part surrounding a lower space under said teat space, said upper part and said lower part being removably interconnected.

15. An apparatus as claimed in claim 14, wherein said teat space and said lower space have a substantially uninterrupted open connection with each other.

16. An apparatus as claimed in claim 14 further comprising a locking element for removable securing said upper part and said lower part together.

17. An apparatus in accordance with claim 1 wherein said air suction line is connected to a pressure control valve.

18. An apparatus for milking animals, such as cows, comprising a milking machine which includes teat cups, milk lines connected to said teat cups, each said teat cup comprising an upper part surrounding an upper space in which a teat of an animal to be milked is inserted, and a lower buffer part surrounding a lower space under said upper space, said lower space having a greater diameter than said upper space, said lower space being a buffer space for collected milk, said upper part being removably interconnected to said lower part.

19. An apparatus in accordance with claim 18, wherein said upper part and said lower part are adapted to telescope into each other over a relatively short distance, the apparatus further comprising a locking element for securing said upper part and said lower part in a locked arrangement relative to each other.

20. An apparatus as claimed in claim 18, wherein said lower space and said upper space have a substantially uninterrupted open connection with each other.

21. An apparatus for milking animals, such as cows, comprising a milking machine which includes teat cups, milk lines connected to said teat cups, each said teat cup comprising an upper part surrounding an upper space in which a teat of an animal to be milked is inserted, and a lower buffer part surrounding a lower space under said upper space, said lower space having a greater diameter than said upper space, said upper being removably interconnected to said lower part, and further comprising an air suction conduit, a pulsation vacuum conduit for each said teat cup, said milk line, said air suction conduit and said pulsation vacuum conduit being connected as an integral line system.

22. An apparatus for milking animals, such as cows, comprising a milking machine which includes teat cups, milk lines connected to said teat cups, each said teat cup comprising an upper part surrounding an upper space in which a teat of an animal to be milked is inserted, and a lower buffer part surrounding a lower space under said upper space, said lower space having a greater diameter than said upper space, said upper part being removably interconnected to said lower part, and further comprising a robot arm for automatically connecting and disconnecting said teat cups to and from the teats of an animal, said robot arm carrying a tubular conduit for connection to a bulk milk tank, a pulsating vacuum line and an air suction conduit, said tubular conduit, said pulsating vacuum line and said air suction conduit carried by said robot arm interconnecting said teat cup via a flexible milk line, a flexible pulsation line and a flexible air suction line.

23. An apparatus for milking animals, such as cows, comprising a milking machine which includes teat cups, milk lines connected to said teat cups, each said teat cup comprising an upper part surrounding an upper space in which a teat of an animal to be milked is inserted, and a lower buffer part surrounding a lower space under said upper space, said lower space having a greater diameter than said upper space, said upper part being removably interconnected to said lower part, and further comprising a robot arm for automatically connecting and disconnecting said teat cups to and from the teats of an animal, said robot arm carrying a tubular conduit for connection to a bulk milk tank, a pulsating vacuum line and an air suction conduit, said tubular conduit, said pulsating vacuum line and said air suction conduit carried by said robot arm interconnecting said teat cup via a flexible milk line, a flexible pulsation line and a flexible air suction line and yet further comprising a flexible element connecting said teat cup to said robot arm, a control cylinder and piston member associated with said robot arm connected to said flexible element whereby said teat cup is selectively loosely or tautly connected to said robot arm by said flexible element.

24. An apparatus for milking animals, such as cows, comprising a milking machine which includes teat cups, air suction lines connected to said teat cups, milk lines for conveying milk from said teat cups and pulsation lines interconnecting pulsation spaces of said teat cups with a pulsating vacuum source, a said milk line and a said pulsation line for each said teat cup comprising an integral line system whereby such pulsation line and such milk line comprise side-by-side passages through a common flexible integral line.

25. An apparatus for milking animals, such as cows, comprising a milking machine which includes teat cups, milk lines for conveying milk from said teat cups and pulsation lines interconnecting pulsation spaces of said teat cups with a pulsating vacuum source, a said milk line and a said pulsation line for each said teat cup comprising an integral line system whereby such pulsation line and such milk line comprise side-by-side passages through a common flexible integral line, and further comprising an air suction line for each said teat cup, said air suction line being included in said common flexible integral line whereby there are three side-by-side passages extending through said flexible line, one for conveying milk from said teat cup, another for providing a pulsating vacuum to said teat cup and a third for providing a connection to a source of air to said teat cup.

* * * * *